United States Patent Office 3,168,405
Patented Feb. 2, 1965

3,168,405
CULINARY COMPOSITION CONTAINING EDIBLE ACIDIC LIPID ANHYDRIDES
James Bruce Martin and Norman Bratton Howard, Hamilton, Ohio, assignors to The Procter & Gamble Company, Cincinnati, Ohio, a corporation of Ohio
No Drawing. Filed Dec. 28, 1962, Ser. No. 247,860
20 Claims. (Cl. 99—91)

This invention relates to compositions of edible matter and, more particularly, to additives for bakery products such as bread, cakes, pies, doughnuts, icings, fillings, and the like products prepared from emulsions comprising water, fat, proteins and/or carbohydrates.

The volume, texture, and eating qualities of many bakery products are dependent upon the interaction of various ingredients during the mixing operation in which a dough, batter, or other emulsion is formed and the stabilization during subsequent baking and/or storage of said bakery products. Many attempts have been made to improve the emulsion characteristics of bakery products by incorporating therein small amounts of various edible additives which are able to affect the colloidal properties of the proteinaceous, amylaceous, or oleaginous bakery constituents. Although a number of the conventional additives such as lecithin and the partial glycerides of higher fatty acids have been found to be useful emulsifiers in bakery products, they have not been able to achieve the desired air incorporation with concurrent foam stability during preparation and baking of doughs, batters, and other bakery emulsions.

It is, therefore, a primary object of the present invention to provide superior air incorporation with stability of foam in bakery products prepared from batters, doughs, and other bakery emulsions.

It is a further object to provide means for the preparation of bread, cakes, pies, doughnuts, icings, fillings, and the like bakery products having improved volume, texture and eating qualities.

In accordance with the present invention it has been discovered that improved air incorporation with foam stabilization in bakery products can be achieved by introducing into a shortening-containing emulsion, or component thereof, a small but effective amount of an acidic lipid anhydride. The acidic lipid anhydrides of this invention are selected from the group consisting of carboxylic acid anhydrides having from about 24 to about 44 carbon atoms and acid anhydrides containing alkyl radicals having from about 11 to about 21 carbon atoms, said alkyl radicals being connected through ester linkages to esterification components having from 2 to 6 carbon atoms and selected from the group consisting of polyols having from 2 to 6 hydroxyls, monohydroxy-monocarboxylic acids, monohydroxy-polycarboxylic acids having from 2 to 3 carboxyls, polycarboxylic acids having from 2 to 3 carboxyls, and polyhydroxy-polycarboxylic acids having from 2 to 4 hydroxyls and from 2 to 3 carboxyls, said acidic lipid anhydrides bearing —CO.O.CO— groups which are formed from carboxyl groups linked together. These acidic lipid anhydride additives are used in amounts of from about 0.1% to about 16%, and preferably from about 0.25% to about 8%. All percentages mentioned herein are by weight of the shortening unless otherwise stated.

The said acidic lipid anhydrides are high molecular weight lipid derivatives of low molecular weight hydroxy and carboxy materials which are formed in a manner whereby they simultaneously satisfy certain conditions specified hereinafter:

(1) They contain, per monomeric molecule, 1 to 6 lipophilic groups, such as saturated or olefinically unsaturated aliphatic hydrocarbon radicals having from about 11 to about 21 carbon atoms; and (2) They contain, per monomeric molecule, 1 acid anhydride group derived from the linking together of 2 carboxyl groups, and 0 to 10 carboxylate groups derived from the linking together of carboxyl and hydroxyl groups.

The acidic lipid anhydrides of this invention can be characterized by the general formula as follows:

(I)  $R_m(-CO.O-)_n(-CO.O.CO-)_pX_q$ wherein:

R is selected from the group consisting of saturated and olefinically unsaturated aliphatic hydrocarbon radicals having from about 11 to about 21 carbon atoms,
X is a residue having from 1 to 6 carbon atoms derived from at least one member of the group consisting of: mono- and polyhydric alcohol, mono- and polycarboxylic acid, and hydroxy mono- and polycarboxylic acid, The letters $m$, $n$, $p$, and $q$ represent the following integers:
   $m=1$ to 6
   $n=0$ to 10
   $p=1$
   $q=0$ to 6, and
provided that when $n=0$, $q=0$ and $m=2$, and provided further that no carbon in R is attached to more than 2 other carbons.

General Formula I recites the essential structures of the acidic lipid anhydrides of this invention although it will be understood that these structures can be arranged in various positions and include polymeric configurations as hereinafter set forth and illustrated, in particular, in Formula II, below.

Of particular value are acidic lipid anhydrides which satisfy both the general formula given above and the formula as follows:

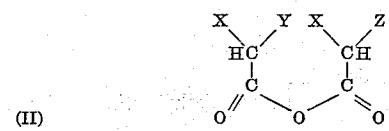

(II) wherein:

X is separately a member selected from the group consisting of —H, —CH₃,

or 2 X's taken together constitute a C—C single bond between carbons alpha to the anhydride group whereby a cyclic structure is formed
Y is a radical selected from the group consisting of:

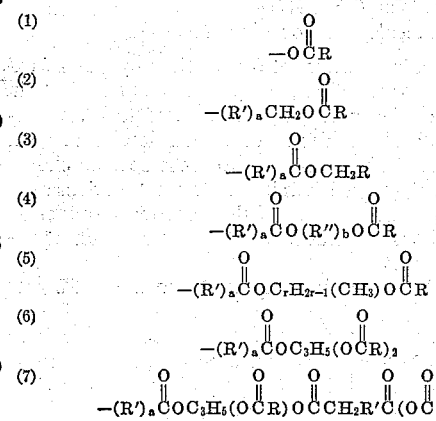

(8) 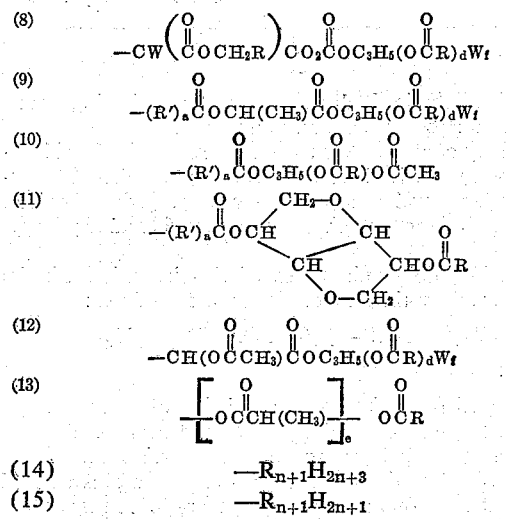

(9)

(10)

(11)

(12)

(13)

(14)               $-R_{n+1}H_{2n+3}$

(15)               $-R_{n+1}H_{2n+1}$

R = a radical selected from the group consisting of $-C_nH_{2n+1}$ and $-C_nH_{2n-1}$ R' = a radical selected from the group consisting of $-CH_2-$, $-C_2H_4-$, $-C_3H_6-$ and $-OCH_2-$ R'' = a radical selected from the group consisting of $-CH_2-$ and a 2,2'-disubstituted diethyl ether group R''' = 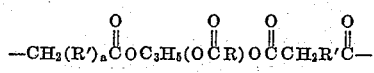

W = a radical selected from the group consisting of $-OH$ and

Z = a member selected from the group consisting of $-H$ and Y $a$ = zero to 1
$b$ = 1 to 6
$c$ = zero to 10
$d$ = 1 to 2
$e$ = zero to 2
$f$ = zero to 1
$n$ = 11 to 21
$r$ = 2 to 4, and provided that When R'' = a 2,2'-disubstituted diethyl ether radical, $b$ = 1

When R'' = $-CH_2-$, $b$ = 2 to 6

When Y = radical (1), the X's are taken together to form a C—C single bond between carbons alpha to the anhydride group When Y = radicals (2) through (11), X = $-H$ When Y = radical (12), X =

When Y = radical (13), X = $-CH_3$

When Y = radicals (14) or (15), X = $-H$

The classes of substances set forth below by way of example illustrate various acidic lipid compounds that, in accordance with the invention, can be used to form suitable acidic lipid anhydrides as described hereinafter; but the invention is not to be limited to these specific classes of substances: (As used herein, the term "condensation product" is intended to cover the reaction product in which ester groups form as a result of the reaction of the recited components.)

a. A fatty acid having from about 12 to about 22 carbon atoms;

b. The condensation product of fatty acid containing from about 12 to about 22 carbon atoms with a monohydroxy-monocarboxylic acid having from 2 to 6 carbon atoms;

c. The condensation product of a fatty acid having from about 12 to about 22 carbon atoms with a hydroxypolycarboxylic acid having from 1 to 4 hydroxy groups, said hydroxypolycarboxylic acid containing 3 to 6 carbon atoms and said condensation product having at least 1 free carboxyl group per molecule;

d. The condensation product of a hydroxypolycarboxylic acid having from 1 to 4 hydroxy groups with a fatty acid having from 2 to 6 carbon atoms and with a partial fatty acid glyceride containing an average of from 1 to 2 fatty acid radicals having from about 12 to about 22 carbon atoms, said hydroxypolycarboxylic acid having 3 to 6 carbon atoms and said condensation product having at least one free carboxyl group per molecule;

e. The condensation product of a polycarboxylic acid having from 0 to 4 hydroxy groups with hydroxy compounds selected from the group consisting of straight chain fatty alcohols having from about 12 to about 22 carbon atoms and partial fatty acid glycerides containing an average of from 1 to 2 fatty acid radicals having from about 12 to about 22 carbon atoms, said polycarboxylic acid having 3 to 6 carbon atoms and said condensation product having at least one free carboxyl group per molecule;

f. The condensation product of a dicarboxylic acid having no hydroxy groups and containing from 3 to 6 carbon atoms with a mono-, or polyhydric fatty material selected from the group consisting of:
  (1) A straight chain aliphatic diol ester of fatty acid, said diol having from 3 to 5 carbon atoms and said fatty acid having from about 12 to about 22 carbon atoms;
  (2) A partial fatty acid glyceride containing an average of from 1 to 2 fatty acid radicals having from about 12 to about 22 carbons atoms;
  (3) A partial fatty acid glyceride containing an average of at least 1 fatty acid radical having from about 12 to about 22 carbon atoms and an average of at least 1 fatty acid radical having from 2 to 6 carbon atoms;
  (4) A straight chain fatty alcohol having from about 12 to about 22 carbon atoms;
  (5) A hexitan ester of fatty acids having from about 12 to about 22 carbon atoms;
  (6) A monohydroxy-monocarboxylic acid condensate of a partial fatty acid glyceride containing an average of from 1 to 2 fatty acid radicals having from about 12 to about 22 carbon atoms, said monohydroxy-monocarboxylic acid having from 2 to 6 carbon atoms; and g. Mixtures of the preceding materials.

Specific examples of the preceding named classes of materials are set forth below by way of example only; and the invention is not to be limited to these specific materials.

A particularly desirable fatty acid for the preparation of acidic lipid anhydrides in the practice of this invention is stearic acid. Examples of other suitable fatty acids are lauric acid, myristic acid, palmitic acid, oleic acid, arachidic acid, and behenic acid. These so-called "long-chain" fatty acids can be readily obtained from glycerides by saponification, acidulation, and isolation procedures. The fatty acid desired determines the choice of glyceridic material. For example, a technical grade of stearic acid can be obtained from hydrogenated soybean oil, a technical grade of behenic acid can be obtained from hydrogenated rapeseed oil, and a technical grade of oleic acid can be obtained from olive oil.

Among the monohydroxy-monocarboxylic acids which are suitable for forming either monomeric or polymeric esters or condensation products with the aforesaid "long-chain" fatty acids are the following: glycolic acid, lactic acid, sarcolactic acid, hydracrylic acid, 4-hydroxybutyric acid, 5-hydroxypentanoic acid, and 6-hydroxyhexanoic acid. The fatty acyl derivatives of the preceding named monohydroxy-monocarboxylic acids can be prepared by various methods, which includes acylation with fatty acid chlorides such as described in U.S. Patent 2,251,695, granted to Tucker, August 5, 1941. Monoacyl diol esters with primary hydroxyl groups are readily oxidized to monoacyl derivatives of monohydroxy-monocarboxylic acids. Sodium permanganate in acetic acid is an effective oxidizing system. One method of the preparation of fatty acid esters of polymeric monohydroxy-monocarboxylic acids which can be used in the practice of this invention is described in U.S. Patent 2,789,992, granted to Thompson and Buddemeyer, April 23, 1957.

Examples of condensation products of hydroxy-polycarboxylic acids and fatty acids which can be used to form acidic lipid anhydrides of this invention are the condensation products of either malic, tartaric, citric, citramalic, trihydroxy glutaric, mucic, saccharic, or mannosaccharic acid with any of the preceding named "long-chain" fatty acids. These materials can be prepared by acylating the hydroxy-polycarboxylic acids with fatty acid chlorides by reaction in appropriate solvents such as pyridine, quinoline, dioxane, dimethylformamide, dimethylacetamide and mixtures thereof, either with or without addition of lipid solvents such as chloroform, benzene, and ethyl ether. These reactions can be carried out over a wide temperature range of from 0° C. to about 150° C. or higher as long as undesirable side reactions are avoided. Upon completion of the acylation reaction, the desired condensation products are isolated by dilution with an aqueous phase followed by washing, and/or distillation, and/or crystallization when required to remove solvents, excess reactants, and impurities. The method of U.S. Patent 2,251,695, granted to Tucker, August 5, 1941, is an example of such a procedure.

The aforesaid hydroxypolycarboxylic acids can also be reacted in a like manner with so-called "short chain" fatty acids having from 2 to 6 carbon atoms such as acetic and propionic. The acyl derivative thereof can be reacted with either a monoglyceride or diglyceride, or a mixture of mono- and diglycerides containing fatty acid radicals of the preceding named "long-chain" fatty acids to form suitable materials for the preparation of the acidic lipid anhydrides of this invention. A particularly desirable product of this class is diacetyl monoglyceridyl tartrate. The latter substance can also be prepared by means such as described in U.S. Patent 2,236,516, granted to Cahn and Harris, April 1, 1941.

Specific condensation products of polycarboxylic acids with the fatty alcohols and partial fatty acid glycerides are the condensation products of either malic, tartaric, citric, citramalic, trihydroxy glutaric, mucic, saccharic, mannosaccharic, malonic, succinic, glutaric, methyl succinic, dimethyl succinic, adipic, tricarballylic, fumaric, itaconic, mesaconic, citraconic, or aconitic acid with straight chain fatty alcohols containing from about 12 to about 22 carbon atoms, such as palmityl and stearyl alcohols, and the preceding named mono- and/or diglycerides. These condensation products can be prepared by esterifying polycarboxylic or hydroxy polycarboxylic acids with fatty alcohols and/or mono- and diglycerides by direct esterification. This reaction is advantageously carried out in a mutual solvent such as dimethylformamide, dimethylacetamide, dioxane, xylene and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants, and impurities. These condensation products should contain one or more unesterified carboxyl groups per molecule. A particularly desirable product of this class is stearyl monoglyceridyl citrate.

The dicarboxylic acid esters of mono- and poly-hydric fatty materials include the condensation product of succinic, methyl succinic, dimethyl succinic, glutaric, malonic, adipic, fumaric, or diglycolic acids with:

(1) A monoester of propylene glycol, 1,3-propanediol, 1,4-butanediol, 1,3-butanediol, or 1,5-pentanediol with any of the preceding named "long-chain" fatty acids, such as propylene glycol monostearate;
(2) Mono- and/or diglycerides of any of the preceding named "long-chain" fatty acids, such as mono- and/or dipalmitin;
(3) Acetylated monoglycerides of any of the preceding named "long-chain" fatty acids, such as monoacetyl monobehenin;
(4) A straight chain fatty alcohol having from about 12 to about 22 carbon atoms, such as palmityl and stearyl alcohol;
(5) An ester of either sorbitan or mannitan with any of the preceding named "long-chain" fatty acids, such as sorbitan monostearate;
(6) A condensate of any of the preceding named monohydroxy-monocarboxylic acids with any of the preceding named mono- and diglycerides, such as lactyl monostearin.

They can be prepared by the same procedures used to prepare the condensation products of polycarboxylic acids with the fatty alcohols and partial fatty acid glycerides, above, using the appropriate dicarboxylic acids and mono- or polyhydric fatty materials. It is also advantageous to prepare acidic lipids of these types by reactions of the hydroxylic intermediates with appropriate cyclic anhydrides of dicarboxylic acids such as succinic anhydride, glutaric anhydride, and diglycolic anhydride.

All of the preceding named specific esters and condensation products are acidic lipid materials having at least 1 free carboxyl group per molecule. The acid anhydrides of these and related acidic lipid materials can be prepared by admixing the acidic lipid with an excess of acetic or propionic anhydride, cooling the reaction product, crystallizing the acidic lipid anhydride from the mixture of acetic or propionic acid and excess acetic or propionic anhydride, and collecting the desired product by filtration. A useful method for preparing certain acid anhydrides is described in detail in U.S. Patent 2,520,139, granted to Fuchs, August 29, 1950.

The most effective processes for the formation of the acidic lipid anhydrides of this invention employ metathesis with acetic anhydride either at low temperatures, i.e., 0° to 60° C. with perchloric acid catalysis, or at higher temperatures, i.e., 60° to 150° C. without catalysis with perchloric acid, but with volatilization of the acetic acid formed in the reaction.

Although specific methods of preparing the aforesaid acidic lipids and their acid anhydrides are described herein, it is not intended that the invention should be limited to a particular method of preparation of these materials.

As used herein, the term "lactic acid ester" refers to a condensation product containing esters of lactic acid and fatty acid with glycerine in which the fatty acid was approximately one-half palmitic acid and one-half stearic acid. Based on a series of analyses, the composition was approximately 36.4% monolactyl monofatty acid glyceride; 23.6% monolactyl difatty acid glyceride; 22.7% fatty acid diglyceride; 4.9% fatty acid monoglyceride; 4.5% fatty acid triglyceride; 4.2% free lactic acid; 3.7% lactyl glycerides; and a trace of free fatty acid.

The acidic lipid anhydrides can be incorporated into the bakery products by direct addition to the batter, dough, or other shortening-containing emulsion, or by admixture with a dry ingredient in the form of a pre-mix for said emulsion. In the practice of this invention it has been found that especially desirable results are obtained in many instances by mixing the acidic lipid anhydride with either an amylaceous or oleaginous substance before incorporating it into the shortening-containing emulsion.

The amylaceous substances which can be employed for this purpose can be a part or all of the flour normally employed in the preparation of bakery products such as cakes or pies. It can also be a substance such as starch which is of particular use in the preparation of bakery products such as cake or pie fillings. The acidic lipid anhydride preferably is mixed with the flour to form a premix by direct adsorption onto the flour from a nonpolar solvent such as ethyl ether and hexane. In this method of incorporation, the acidic lipid anhydride is used in an amount of from about 0.25% to about 8% by weight of the flour or other amylaceous substance. The anhydride is dissolved in the ethyl ether and then the flour is slurried in the solvent. The solvent is evaporated from the flour at room temperature. If the anhydride does not readily dissolve in the ethyl ether, another solvent such as benzene or chloroform can be added. Under the latter conditions, it is generally preferable to remove the last traces of solvent under reduced pressure.

The oleaginous substances which can be employed in the practice of this invention for admixture with the acidic lipid anhydrides are plastic, semi-fluid, or liquid glyceride shortenings derived from animal, vegetable, or marine fats and oils. These glycerides can have saturated or unsaturated long-chain fatty acid groups having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, behenoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, whale oil, sardine oil, menhaden oil, herring oil, lard, tallow and the like. The glycerides can also contain, in part, one or two short-chain saturated fatty acid groups having from 2 to about 6 carbon atoms such as acetyl, propanoyl, butanoyl, valeryl, and caproyl; they can be prepared by random or low temperature interesterification reactions of fatty triglyceride-containing oils and fats such as cottonseed oil and lard; and they can be otherwise formed by various organic syntheses.

The shortening can also contain small amounts (usually not exceeding about 5 percent by weight of the shortening) of conventional emulsifiers and other agents such, for example, as fatty acid mono-and diglyceride emulsifiers, lactylated glyceride emulsifiers, sorbitan or polyoxyethylene sorbitan esters of fatty acids, free fatty acids, and many other substances commonly used in shortenings to improve their cooking or other properties.

The acidic lipid anhydrides can be incorporated in the shortening by any suitable means whereby a substantially homogeneous mixture is formed. When it is desired to prepare a liquid shortening composition (as distinguished from a plastic or solid shortening) which contains the acidic lipid anhydrides, it is preferable to incorporate therein, additionally, an alpha-phase crystal tending emulsifier in amounts of from about 0.5% to about 16% by weight of the shortening.

Although it is not desired to be bound by theory, it is believed that the film forming tendency of the alpha-phase crystal tending emulsifier promotes the incorporation of air during the preparation of the shortening-containing emulsion, such as a cake batter. The incorporation of air in a cake batter is achieved essentially by the production of a foam through an extension of the protein film. However, the oily phase of the batter normally tends to hinder the foam building properties of the protein. It is believed that the film forming tendency of the alpha-phase crystal tending emulsifier at the oil-aqueous phase interface prevents the oily phase from acting as a foam depressant toward the protein.

The alpha-phase crystal tending emulsifiers used in this invention are to be distinguished from fatty materials having beta or beta-prime crystal tending phases. These types of crystalline structures can be identified by their X-ray diffraction patterns and are described in U.S. Patents 2,521,241-2, granted to Paul J. Mitchell, Jr., September 5, 1950, and assigned to The Procter & Gamble Company. The alpha crystalline form is the least stable, least dense, and lowest melting of these crystalline forms.

Among the alpha-phase crystal tending emulsifiers which can be used in the practice of this invention are the following classes of materials:

a. A monoester of a straight chain aliphatic diol with a saturated fatty acid, said diol containing from 3 to 5 carbon atoms and said saturated fatty acid having from about 12 to about 22 carbon atoms, such as propylene glycol monostearate;

b. The condensation product of a monohydroxy-monocarboxylic acid having from 2 to 6 carbon atoms with a partial fatty acid glyceride containing an average of from 1 to 2 fatty acid radicals having from about 12 to about 22 carbon atoms, such as monoglyceridyl lactate;

c. A 1,3-diglyceride containing a saturated fatty acid having from about 16 to about 22 carbon atoms and a saturated fatty acid having from 2 to 4 carbon atoms, such as 1-acetyl-3-monostearin;

d. A 1,2-diglyceride containing a saturated fatty acid having from about 16 to about 22 carbon atoms and a saturated fatty acid having from about 12 to about 18 carbon atoms, such as 1,2-distearin; and e. A fatty acid ester of diethylene gylcol, said fatty acid having from about 12 to about 22 carbon atoms.

The acidic lipid anhydrides also can be used as dry ingredients of a prepared cake mix in combination with other materials such as flour and sugar. Or, if preferred, they can be added in dry form directly to the cake batter or other bakery emulsion.

The acidic lipid anhydrides of this invention have been found to markedly enhance cake volume, texture and grain and materially improve batter stabilization. The most beneficial and dramatic effect of the acidic lipid anhydrides is their ability to stabilize foams after they are formed. This effect is seen in the excellent stability of foams during baking and the consequent formation of very good cake texture and grain. Although many of the acidic lipids from which the anhydrides can be derived are capable of facilitating the incorporation of air in cake batters, they do not have the characteristic stabilizing properties of the acidic lipid anhydrides. The acidic lipids also tend to promote the formation of a coarse open-grained texture in contradistinction to the very fine grain produced by the anhydrides. Because of these bakery deficiencies of the acidic lipids, their successful use in batter systems generally depends upon the addition of other materials which are unnecessary in the case of the acidic lipid anhydrides of this invention.

Although it is not desired to be bound by theory, it is believed that the nonionic nature of the acidic lipid anhydrides, as distinguished from the ionic nature of the acidic lipids, indicates the probable formation of a covalent bond with batter ingredients, such as protein and starch, in contrast to the unstable ionic interaction which functions in the acidic lipid mechanism. The formation of the covalent bond apparently leads to the effective stabilization of said batter. The acidic lipid anhydrides of this invention do not ionize in batter systems as do the acidic lipids. Since technologists in the field had previously centered their attention on the ionic nature of the carboxyl group as important in batter systems, it was unexpected to discover that the nonionic anhydrides have the far superior foam stabilization properties described herein.

Again, though it is not desired to be bound by theory, it is believed that the solid state crystal structure of the acidic lipid anhydrides may have importance upon their functionality in batter systems in a unique manner not manifested by the acidic lipids.

It has also been discovered that excellent cream-type icings having excellent volume, very good stability, and firm body can be prepared from liquid shortenings by the addition thereto of the acidic lipid anhydrides and alpha-phase crystal tending emulsifiers described herein. The cream-type icings are those which contain a substantial proportion of fat or shortening and can be whipped to incorporate and retain a large volume of air.

Many of the acidic lipid anhydrides of this invention do not have a harmful effect upon the smoke points of shortenings which are useful for frying as well as baking. This should be contrasted with the detrimental effect upon high smoke points caused by the mono- and diglyceride emulsifiers incorporated in conventional all-purpose shortenings. The preferred anhydrides for this purpose are:

The fluid shortening and the other liquid ingredients (milk and egg whites) were added simultaneously to all of the dry mix ingredients and mixed with a Sunbeam table model electric mixer at 500 r.p.m. for a total of 4 minutes. 400 grams of batter were placed in an 8″ pan and baked in an oven at 365° F. for about 25 minutes.

Several other similar cakes were baked according to the above procedure using either different amounts of octadecyl succinate anhydride or various other acidic lipid anhydrides indicated below in place of the 0.25% octadecyl succinate anhydride used above. The increase in the amount of anhydride used was offset by a complementary decrease in the amount of base oil used. The table set forth below shows the hot and cold cake volumes obtained by the use of these improved shortenings. All cake volumes are stated in cc. per 400 gm. of batter. The hot volumes were measured immediately after completion of the baking period; and the cold volumes were measured 20 minutes thereafter.

*Table I*

THE EFFECT OF ACIDIC LIPID ANHYDRIDES ON HIGH RATIO CAKE PERFORMANCE (ANHYDRIDE INCORPORATED IN LIQUID SHORTENING)

| Anhydride | Hot/Cold Volumes (cc./400 gm. batter) at various concentration levels of anhydride | | | |
|---|---|---|---|---|
| | 0.25% | 0.50% | 1.00% | 2.00% |
| Octadecyl succinate anhydride | 1,170/1,080 | 1,195/1,115 | 1,315/1,235 | 1,475/1,370 |
| Stearoyl propylene glycol succinate anhydride | 985/895 | 1,315/1,225 | 1,440/1,350 | 1,670/1,440 |
| Monostearin disuccinate anhydride | 1,300/1,205 | 1,300/1,225 | 1,465/1,330 | 1,130/1,095 |
| Distearin succinate anhydride | 1,170/1,115 | 1,185/1,150 | 1,225/1,170 | 1,555/1,330 |
| Malic stearate anhydride | 1,405/1,330 | 1,605/1,440 | 1,585/1,370 | 1,490/1,280 |
| Tartaric distearate anhydride | 1,475/1,385 | 1,505/1,360 | 1,445/1,250 | 1,440/1,240 |
| Lactic acid ester succinate anhydride | 1,405/1,300 | 1,370/1,280 | 1,475/1,405 | 1,535/1,440 |

Control cake without anhydride, 1,030/980, cake dipped, coarse grain.

distearin succinate anhydride; stearoyl propylene glycol succinate anhydride; stearoyl sorbitan succinate anhydride; and oleoyl propylene glycol glutarate anhydride.

Various minor ingredients such as: flavor; color; antioxidants, such as butylated hydroxytoluene, butylated hydroxyanisole, citric acid, and methyl silicone; and mold inhibitors, such as sorbic acid and sodium benzoate can also be added to the compositions of this invention if desired.

The following examples further illustrate the compositions of this invention but the invention is not limited to these specific examples.

EXAMPLE 1

A stable fluid shortening was prepared by mixing together the following materials in the stated amounts:

| | Percent by weight |
|---|---|
| Refined and bleached cottonseed oil | 85.75 |
| Propylene glycol stearate (approximately ½ each mono- and diesters) | 14 |
| Octadecyl succinate anhydride | 0.25 |

The above fluid shortening was used to prepare a single-stage high ratio white cake consisting of the following ingredients:

| | Parts by weight, g. |
|---|---|
| Cake flour | 107.0 |
| Granulated sugar | 133.0 |
| Sodium chloride | 2.5 |
| Double acting baking powder | 6.8 |
| Shortening | 47.5 |
| Whole milk | 130.0 |
| Egg whites (fresh) | 60.0 |

The acidic lipid anhydrides in this example were prepared by two methods. Those acidic lipids capable of forming a cyclic anhydride (malic stearate anhyride and tartaric distearate anhydride) employed perchloric acid catalyzed metathesis of the acidic lipid with acetic anhydride. All the other acidic lipid anhydrides were prepared by an uncatalyzed metathesis of acidic lipids with acetic anhydride. An example of each method is set forth below.

(a) 20 grams (0.05 mole) of malic stearate were added to 10 ml. (0.11 mole) of acetic anhydride, 100 ml. of toluene, and 0.01 ml. of 70% perchloric acid. The mixture was stirred at room temperature. Dissolution of the malic stearate took place readily and precipitation of the malic stearate anhydride began quickly. The mixture was diluted with 250 ml. hexane and stirred for 15 minutes with cooling in an ice bath. The catalyst was inactivated by addition of 1 ml. of a slurry of sodium methoxide in xylene (0.09 g. sodium methoxide per ml.). The precipitate was collected by filtration and redissolved in 250 ml. hexane with warming. On cooling the solution to room temperature, filtering, and vacuum drying, a yield of 14.5 grams (76%) of malic stearate anhydride was obtained.

The anhydride product was found by analysis to have the following characteristics:

| | |
|---|---|
| Melting point | °C__ 70.7 |
| Saponification value (S.V.) | 438 |
| Percent carbon | 68.1 |
| Percent hydrogen | 9.9 |

The calculated values were: S.V.=441; percent C=69.1; percent H=10.0.

(b) 44 grams (0.1 mole) of stearoyl propylene glycol hydrogen succinate were mixed with 30 grams (0.3 mole) of acetic anhydride and heated at reflux for one hour. The mixture was then heated at 120° to 130° C. for 2 hours under a pressure of 2-5 mm. Hg. The residue was cooled with recovery of 41.5 grams (96% yield) of stearoyl propylene glycol succinate anhydride.

The anhydride product was found by analysis to have the following characteristics:

| | |
|---|---|
| Melting point ° C | 77 |
| Saponification value (S.V.) | 387 |
| Percent carbon | 69.0 |
| Percent hydrogen | 10.4 |

The calculated values were: S.V.=388; percent C=69.4; percent H=10.4.

Other acidic lipid anhydrides employed in the example herein can be prepared by similar methods.

EXAMPLE 2

Several homogeneous plastic shortening compositions were formed by mixing together various amounts of either (a) distearin succinate anhydride, (b) stearoyl propylene glycol succinate anhydride, or (c) lactic acid ester succinate anhydride with a plastic shortening consisting of partially hydrogenated vegetable oil consisting of soybean and cottonseed oils in a weight ratio of 85:15 and having an iodine value of 70-75. The plastic shortening compositions were used to prepare 2-stage high ratio white cakes as follows:

| | Parts by weight, grams |
|---|---|
| Cake flour | 107.0 |
| Granulated sugar | 133.0 |
| Sodium chloride | 2.5 |
| Double acting baking powder | 6.8 |
| Shortening | 47.5 |
| Whole milk | 130.0 |
| Egg whites (fresh) | 60.0 |

The plastic shortening and 70% of the whole milk were added to the dry ingredients and mixed with a Sunbeam electric mixer at 500 r.p.m. for 2 minutes. The batter was scraped down and the egg whites and balance of the milk were added. Mixing at 500 r.p.m. was continued for an additional 2 minutes. 400 grams of the batter were placed in an 8" pan and baked in an oven at 365° F. for about 25 minutes. The above procedure was followed for each sample of acidic lipid anhydride.

The table set forth below shows the cake volumes obtained with these acidic lipid anhydride additives.

Table II

THE EFFECT OF ACIDIC LIPID ANHYDRIDES ON HIGH-RATIO CAKE PERFORMANCE (ANHYDRIDE INCORPORATED IN PLASTIC SHORTENING)

| Anhydride [1] | | | Hot/Cold Volumes (cc./400 g. batter) |
|---|---|---|---|
| (a) Distearin succinate anhydride | (b) Stearoyl propylene glycol succinate anhydride | (c) Lactic acid ester succinate anhydride | |
| 0.5 | | | 1,075/1,020 |
| 1.0 | | | 1,075/1,040 |
| 2.0 | | | 1,330/1,225 |
| | 1.0 | | 1,425/1,300 |
| | | 2.0 | 1,300/1,130 |
| | | 4.0 | 1,440/1,265 |
| Control Cake Without Anhydride [2] | | | 1,040/985 |

[1] In percent (shortening weight basis).
[2] Shortening consisting of partially hydrogenated vegetable oil consisting of soybean and cottonseed oils in a weight ratio of 85:15 and having an iodine value of 70-75.

EXAMPLE 3

White cakes were prepared from the following ingredients:

| | Parts by weight, grams |
|---|---|
| Granulated sugar | 116.5 |
| Shortening | 31.2 |
| Dextrose | 5.7 |
| Non-fat milk solids | 8.5 |
| Sodium chloride | 2.3 |
| Double acting baking powder | 7.25 |
| Cake flour | 115.0 |
| Flavor | 0.25 |
| Egg whites (fresh) | 30.0 |

The shortening and egg whites were added to a mixture of the dry ingredients and then 150 ml. of water were mixed in with an electric mixer at 500 r.p.m. for 3 minutes. 440 grams of batter were placed in an 8" pan and baked at 375° F. for 25 minutes.

The shortening consisted of 84% refined, bleached cottonseed oil, 14% propylene glycol stearate (½ each of mono- and diesters), and 2% of an acidic lipid anhydride. The table set forth below shows the cake volumes obtained with this shortening when the described anhydrides were used as additives.

Table III

THE EFFECT OF ACIDIC LIPID ANHYDRIDES IN WHITE CAKE MIX FORMULATION

| Anhydride | Hot/Cold Volumes (cc./440 gm. batter) |
|---|---|
| 2.0% Stearoyl 4 Hydroxy Butyric Anhydride | 1,410/1,300 |
| 2.0% Octadecyl Glutarate Anhydride | 1,210/1,140 |
| 2.0% Stearoyl Propylene Glycol Succinate Anhydride | 1,230/1,145<br>1,280/1,225<br>1,475/1,370 |
| 2.0% Monostearin Disuccinate Anhydride | 1,420/1,320 |
| 2.0% Malic Stearate Anhydride | 1,490/1,425 |
| 2.0% Lactic Acid Ester Succinate Anhydride | 1,305/1,210 |
| Control Cake Without Anhydride | [1] 1,095/1,040 |

[1] Unstable batter; coarse grain.

EXAMPLE 4

Cream-type icing were prepared from the following ingredients:

| | Parts by weight, grams |
|---|---|
| Fluid shortening | 88 |
| Non-fat milk solids | 21 |
| Sodium chloride | 2 |
| 6X powdered sugar | 335 |
| Water | 59 |

The fluid shortening consisted of: 89% partially hydrogenated soybean oil having an iodine value of about 107; 2% substantially completely hydrogenated soybean oil having an iodine value of about 8; 1% stearic acid; and 8% of an interesterification product of propylene glycol and substantially completely hydrogenated soybean oil (having an iodine value of about 8) which consisted of about 55% to 65% propylene glycol monostearate and 35% to 45% of a mixture of propylene glycol distearate, mono-, di- and tri-glycerides, glycerol and free fatty acid. The percentage shown for the partially hydrogenated soybean oil included small amounts of acidic lipid anhydrides as shown in the table below.

The icing ingredients were mixed for 5 minutes with a Hobart C-100 mixer at speed number 1 and scraped down in the mixing bowl at intervals of 2½ minutes. Mixing was then continued for an additional 10 minutes at speed number 2 in the same mixer, with the icing being scraped down at the end of each 5 minute interval.

The table set forth below shows the icing densities and specific volumes obtained with cream icings using various acidic lipid anhydrides in the shortenings. The icings with these anhydrides added to the shortening were firm and did not flow or bleed liquids after standing for 30 minutes. By way of comparison, the control icing which did not contain the acidic lipid anhydride was soft and showed appreciable flowing after the same period of time.

*Table IV*

CREAM ICINGS MADE WITH FLUID SHORTENING CONTAINING ACIDIC LIPID ANHYDRIDES

| Anhydride [1] | Icing Density (g./ml.) | Specific Volume |
|---|---|---|
| 4% Malic Stearate Anhydride | 0.91 | 1.10 |
| 4% Monostearin Disuccinate Anhydride | 0.86 | 1.16 |
| 4% Octadecyl Succinate Anhydride | 0.91 | 1.10 |
| 4% Stearoyl Propylene Glycol Succinate Anhydride | 0.92 | 1.09 |
| 4% SPGSA/MSDSA [2] (1:1 by weight) | 0.77 | 1.30 |
| 4% SPGSA/ODSA [3] (1:1 by weight) | 0.88 | 1.14 |
| Control Icing, Without Anhydride | 1.24 | 0.81 |

[1] In percent (shortening weight basis).
[2] Stearoyl Propylene Glycol Succinate Anhydride/Monostearin Disuccinate Anhydride.
[3] Same/Octadecyl Succinate Anhydride.

EXAMPLE 5

High-ratio white cakes were prepared according to the cake formula and procedure described in Example 1 except that the shortening in the cake formula consisted of 86% cottonseed oil and 14% propylene glycol stearate (½ each mono- and diesters) and the acidic lipid anhydrides were added to the cake batter as dry ingredients. The following table shows the results obtained when several different levels of various anhydrides were used in the batter in this manner.

*Table V*

THE EFFECT OF ACIDIC LIPID ANHYDRIDES AS CAKE FLOUR IMPROVING AGENTS (ANHYDRIDE USED AS DRY INGREDIENT IN FLOUR)

| Anhydride [1] | Hot/Cold volumes (cc./400 gm. batter) |
|---|---|
| 1.0% Hexadecyl Adipate Anhydride | [2] 1,410/1,310 |
| 1.0% Octadecyl Adipate Anhydride | [2] 1,225/1,150 |
| 1.0% Stearoyl 4-Hydroxy Butyric Anhydride | [2] 1,400/1,270 |
| 2.0% Stearic Anhydride | [2] 1,295/1,205 |
| 0.5% Stearoyl Propylene Glycol Succinate Anhydride | [2] 1,245/1,140 |
| 0.25% Tartaric Distearate Anhydride | [3] 1,315/1,220 |
| 0.50% Tartaric Distearate Anhydride | [3] 1,450/1,370 |
| 0.75% Tartaric Distearate Anhydride | [3] 1,365/1,260 |
| 1.00% Tartaric Distearate Anhydride | [3] 1,630/1,390 |
| Control Cake Without Anhydride | [4] 965/900 |

[1] In percent (shortening weight basis).
[2] Fine grain; stable batter.
[3] Very stable batter; fine grain.
[4] Coarse grain.

EXAMPLE 6

Cakes were baked according to the procedure described in Example 5 except that the acidic lipid anhydrides were added to the flour by adsorption thereon from a non-polar solvent, instead of as a separate dry ingredient. The anhydride was dissolved in ethyl ether and the flour was then slurried in the solvent. A solvent:flour ratio of 1:1 [vol. (ml.)/wt. (g.)] was used. The solvent was then allowed to completely evaporate from the flour at room temperature. After no more solvent could be detected, the flour was sifted and added to the cake formula ingredients. The following table indicates the cake baking results obtained when several different acidic lipid anhydrides were used.

*Table VI*

THE EFFECT OF ACIDIC LIPID ANHYDRIDES AS CAKE FLOUR IMPROVING AGENTS (ANHYDRIDES ADSORBED ONTO FLOUR FROM SOLVENT)

| Anhydride [1] | Hot/Cold Volumes (cc./400 gm. batter) |
|---|---|
| 1.8% stearoyl ethylene glycol succinate anhydride | 1,350/1,225 |
| 1.8% stearoyl butanediol succinate anhydride | 1,225/1,170 |
| 1.8% octadecyl adipate anhydride | 1,260/1,130 |
| 1.8% hexadecyl adipate anhydride | 1,130/1,040 |
| 1.8% stearoyl 4-hydroxy butyric anhydride | 1,315/1,130 |
| 1.8% stearic anhydride | 1,205/1,130 |
| Control cake (solvent treated flour without anhydride) | 950/900 |

[1] In percent (flour weight basis).

EXAMPLE 7

Cakes were baked according to the procedure of Example 6 using 0.5% (flour weight basis) of a 1:1 mixture of tartaric distearate anhydride and malic stearate added to the flour by adsorption thereon from ethyl ether as in Example 6, above. This procedure was repeated for several different types of commercially available flours to give the results shown in the following table. These are widely used cake flours obtained from different mills. The results demonstrate the ability to overcome normal baking variations in flours with the achievement of excellent volume and fine grain in all cakes shown. The malic stearate was added to help improve volume, although its use alone without the tartaric distearate anhydride produced a very coarse grain.

*Table VII*

THE EFFECT OF TARTARIC DISTEARATE ANHYDRIDE AS AN IMPROVING AGENT FOR VARIOUS TYPES OF FLOURS

| Flour | Cake volumes (cc./400 gm. batter) | |
|---|---|---|
| | Without anhydride | 0.25% anhydride [1][2] |
| American beauty | 1,030/980 | 1,605/1,405 |
| Velvet | 1,165/1,100 | 1,460/1,280 |
| Spin | 965/910 | 1,635/1,460 |
| Sno-sheen | 965/895 | 1,425/1,315 |
| Softasilk | 955/885 | 1,475/1,350 |
| Swansdown | 900/855 | 1,605/1,440 |
| Pikes peak | 1,215/1,145 | 1,605/1,350 |

[1] In percent (flour weight basis).
[2] All treated flour cakes were very fine grained.

EXAMPLE 8

Several shortenings consisting of a base of partially hydrogenated vegetable oil consisting of soybean and cottonseed oils in a weight ratio of 85:15 and having an iodine value of 70–75 and acidic lipid anhydride additive were tested for smoke point characteristics according to the A.O.C.S. standard method Cc9a–48. According to this procedure, an open cup (for flash and fire test) is filled to the meniscus marker with fat at approximately 50° C. The fat sample is heated rapidly to within 75° F. (24° C.) of the smoke point; and then the flame is regulated so that the temperature of the oil increases 10°±1° F. (5.55° ±0.555° C.) per minute. The smoke point is taken as the temperature at which the fat gives off continuously a thin bluish smoke.

The following table indicates the smoke point results:

*Table VIII*

THE EFFECT OF ACIDIC LIPID ANHYDRIDES ON THE SMOKE POINT OF A FRYING FAT

| Anhydride [1] | Smoke point (° F.) |
|---|---|
| 2% distearin succinate anhydride | 410 |
| 2% oleoyl propylene glycol glutarate anhydride | 412 |
| 1% stearoyl propylene glycol succinate anhydride | 415 |
| 2% lactic acid ester succinate anhydride | 415 |
| 4% lactic acid ester succinate anhydride | 400 |
| Control shortening without anhydride [2] | 435 |
| Control shortening without anhydride [3] | 365 |

[1] In percent (shortening weight basis).
[2] Shortening consisting of partially hydrogenated vegetable oil consisting of soybean and cottonseed oils in a weight ratio of 85:15 and having an iodine value of 70-75.
[3] Commercial all-purpose shortening consisting of hydrogenated vegetable oil containing mono- and diglyceride emulsifiers.

EXAMPLE 9

Single-stage mixed high-ratio white cakes were prepared according to the procedure of Example 1 with a shortening consisting of 86% refined, bleached cottonseed oil and 14% propylene glycol stearate (½ each mono-and diesters). The percentage shown for cottonseed oil also included a small amount of unsaturated acidic lipid anhydride as shown on the Table set forth below. Cake volumes and batter densities obtained with these anhydrides are indicated in said Table.

*Table IX*

THE EFFECT OF UNSATURATED ACIDIC LIPID ANHYDRIDES ON HIGH-RATIO CAKE PERFORMANCE

| Anhydride [1] | Batter Density (g./ml.) | Hot/Cold Cake Volumes (cc./400 g. batter) |
|---|---|---|
| 2% Oleoyl Propylene Glycol Glutarate Anhydride | 0.90 | 1,300/1,225 |
| 4% Oleoyl Propylene Glycol Glutarate Anhydride | 0.90 | 1,425/1,300 |
| 6% Oleoyl Propylene Glycol Glutarate Anhydride | 0.94 | 1,315/1,240 |
| 1% Oleoyl Propylene Glycol Succinate Anhydride | 0.90 | 1,315/1,225 |
| 2% Oleoyl Propylene Glycol Succinate Anhydride | 0.92 | 1,260/1,225 |
| 4% Oleoyl Propylene Glycol Succinate Anhydride | 0.93 | 1,370/1,260 |
| 6% Oleoyl Propylene Glycol Succinate Anhydride | 0.93 | 1,240/1,150 |
| Control Cake Without Anhydride | 0.76 | 985/895 |

[1] In percent (shortening weight basis).

EXAMPLE 10

White cakes were prepared according to the cake formula and procedure of Example 3 with a shortening consisting of 86% refined, bleached cottonseed oil and 14% propylene glycol stearate (½ each mono- and diesters). The percentage shown for cottonseed oil also included a portion of stearoyl propylene glycol succinate anhydride as shown in the table set forth below. Batter density and cake volume and grain obtained with this anhydride at various levels of incorporation in the shortening is indicated in said table.

*Table X*

THE EFFECT OF STEAROYL PROPYLENE GLYCOL SUCCINATE ANHYDRIDE ON WHITE CAKE MIX FORMULATION AT VARIOUS LEVELS OF INCORPORATION

| Percent Anhydride (Shortening Weight Basis) | Batter Density (g./ml.) | Hot/Cold Cake Volumes (cc./440 g. batter) | Grain |
|---|---|---|---|
| 4% | 0.74 | 1,515/1,370 | Very stable; fine grain. |
| 8% | 0.75 | 1,570/1,405 | Fine grain. |
| 12% | 0.75 | 1,660/1,490 | Do. |
| 16% | 0.77 | 1,530/1,440 | Do. |

EXAMPLE 11

High-ratio single-stage mixed white cakes were prepared according to the cake formula and procedure of Example 1 with a shortening consisting of 86% refined, bleached cottonseed oil and 14% propylene glycol stearate (½ each mono- and diesters). The percentage shown for cottonseed oil also included a portion of stearoyl propylene glycol succinate anhydride as shown in the table set forth below. Batter density and cake volume and grain obtained with this anhydride at various levels of incorporation in the shortening is indicated in said table.

*Table XI*

THE EFFECT OF STEAROYL PROPYLENE GLYCOL SUCCINATE ANHYDRIDE ON HIGH-RATIO CAKE PERFORMANCE AT VARIOUS LEVELS OF INCORPORATION

| Percent Anhydride (Shortening Weight Basis) | Batter Density (g./ml.) | Hot/Cold Volumes (cc./400 g. batter) | Grain |
|---|---|---|---|
| 4% | 0.64 | 1,530/1,425 | Fine grain. |
| 8% | 0.71 | 1,440/1,300 | Do. |
| 12% | 0.90 | 1,330/1,225 | Do. |

Similar cake results are obtained when stearoyl propylene glycol glutarate anhydride is substituted for the stearoyl propylene glycol succinate anhydride in the above example.

EXAMPLE 12

High-ratio single-stage mixed white cakes were prepared according to the cake formula and procedure of Example 1 with a shortening consisting of 84% refined, bleached cottonseed oil, 14% propylene glycol stearate (½ each mono- and diesters), and 2% of either (a) malic stearate, (b) malic stearate anhydride, (c) stearoyl propylene glycol hydrogen succinate, or (d) stearoyl propylene glycol succinate anhydride.

The table set forth below shows the cake characteristics obtained with these shortening additives.

*Table XII*

A COMPARISON BETWEEN THE EFFECTS OF ACIDIC LIPIDS AND ACIDIC LIPID ANHYDRIDES ON HIGH-RATIO CAKE PERFORMANCE

| Shortening Additive | Hot/Cold Cake Volumes (cc./400 g. batter) | Cake Texture |
|---|---|---|
| (a) Malic Stearate | 1,710/1,635 | Very coarse grain; cake peaked and cracked in center. |
| (b) Malic Stearate Anhydride | 1,490/1,280 | Very fine grain. |
| (c) Stearoyl Propylene Glycol Hydrogen Succinate | 1,060/1,025 | Very coarse grain; cake dipped in center. |
| (d) Stearoyl Propylene Glycol Succinate Anhydride | 1,670/1,440 | Very fine grain. |

These results indicate the very coarse-grained texture obtained with typical acidic lipids in comparison with the desirable very fine grain produced by the acidic lipid anhydride.

EXAMPLE 13

A white cake was prepared according to the cake formula and procedure of Example 3 with a shortening consisting of 86% cottonseed oil and 14% propylene glycol stearate (½ each mono- and diesters). 16% (shortening weight basis—or about 4% flour weight basis) stearoyl propylene glycol succinate anhydride was incorporated in the cake ingredients by adsorption onto the flour from ethyl ether according to the procedure described in Example 6. The cake batter had a density of 0.62 (g./ml.); and the baked cake had hot/cold volumes of 1570/1240 cc./400 g. batter. This formulation produced a very stable batter, although, as can be seen, the cake shrank somewhat on cooling.

EXAMPLE 14

A fluid shortening consisting of 85.5% refined, bleached cottonseed oil, 14% propylene glycol stearate (½ each mono- and diesters), and 0.5% stearyl monoglyceridyl citrate anhydride (the stearyl monoglyceridyl citrate being "Seqol 140" marketed by Chas. Pfizer & Co., Inc.) was used to prepare a high-ratio white cake according to the cake formula and procedure of Example 1. The cake batter had a density of 0.63 g./ml.; and the baked cake had hot/cold volumes of 1205/1150 cc./400 g. batter and a fine grain.

EXAMPLE 15

A fluid shortening consisting of 84% refined, bleached cottonseed oil, 14% propylene glycol stearate (½ each mono- and diesters), and 2% of the acid anhydride of a succinic acid condensation product of propylene glycol stearate (½ each mono- and diesters) was used to prepare a high-ratio white cake according to the cake formula and procedure of Example 1. The cake batter had a density of 0.82 g./ml.; and the baked cake had hot/cold volumes of 1330/1240 cc./400 g. batter and a fine grain.

EXAMPLE 16

A fluid shortening consisting of 84% refined, bleached cottonseed oil, 14% propylene glycol stearate (½ each mono- and diesters), and 2% monostearoyl sorbitan glutarate anhydride (the sorbitan monostearate being "Span 60" marketed by Atlas Chemical Industries, Inc.) was used to prepare a high-ratio white cake according to the formula and procedure of Example 1. The cake batter had a density of 0.72 g./ml.; and the baked cake had hot/cold volumes of 1675/1460 cc./400 g. batter and a fine grain. The corresponding succinate anhydride of sorbitan monostearate at the 2% level gave a batter density of 0.76 g./ml. and hot/cold volumes of 1620/1460 cc./400 g. batter in a similar cake. It also produced a notably fine-grained texture in the baked cake.

EXAMPLE 17

A fluid shortening consisting of 84% refined, bleached cottonseed oil, 14% propylene glycol stearate (½ each mono- and diesters), and 2% of the acid anhydride of a succinic acid monoester of an interesterification product of propylene glycol and substantially completely hydrogenated soybean oil (having an iodine value of about 8) which consisted of about 55% to 65% propylene glycol monostearate and 35% to 45% of a mixture of propylene glycol distearate, mono-, di- and triglycerides, glycerol and free fatty acid, was used to prepare a high-ratio white cake according to the cake formula and procedure of Example 1. The cake batter had a density of 0.61 g./ml.; and the baked cake had hot/cold volumes of 1385/1300 cc./400 g. batter and a fine grain.

EXAMPLE 18

A fluid shortening consisting of 84% refined, bleached cottonseed oil, 14% propylene glycol stearate (½ each mono- and diesters), and 2% of the acid anhydride of a glutaric acid monoester of the mono- and diglycerides of substantially completely hydrogenated soybean oil having an iodine value of 8 was used to prepare a high-ratio white cake according to the cake formula and procedure of Example 1. The cake batter had a density of 0.64 g./ml.; and the baked cake had hot/cold volumes of 1240/1205 cc./400 g. batter and a fine grain.

EXAMPLE 19

A fluid shortening consisting of 85% refined, bleached cottonseed oil, 14% propylene glycol stearate (½ each mono- and diesters), and 1% of the acid anhydride of a succinic acid monoester of acetylated mono- and diglycerides of substantially hydrogenated vegetable oil (the acetylated partial glycerides being "Myvacet 5–00" marketed by Distillation Products Industries) was used to prepare a high-ratio white cake according to the cake formula and procedure of Example 1. The cake batter had a density of 0.70 g./ml.; and the baked cake had hot/cold volumes of 1385/1315 cc./400 g. batter and a fine grain.

EXAMPLE 20

A fluid shortening consisting of 84% refined, bleached cottonseed oil, 14% propylene glycol stearate (½ each mono- and diesters), and 2% of diacetyl monoglyceridyl tartrate anhydride was used to prepare a high-ratio white cake according to the cake formula and procedure of Example 1. The cake batter had a density of 0.67 g./ml.; and the baked cake had hot/cold volumes of 1460/1350 cc./400 g. batter.

EXAMPLE 21

A fluid shortening consisting of 84% refined, bleached cottonseed oil, 14% propylene glycol stearate (½ each mono- and diesters), and 2% of palmitic anhydride was used to prepare a high ratio white cake according to the cake formula and procedure of Example 1. The cake had a volume of 1205 cc./400 g. batter compared to a similarly prepared cake in which the palmitic anhydride was deleted from the ingredients and which had a volume of 840 cc./400 g. batter. The cake containing the anhydride had a very fine grain compared to the coarse grain of the other cake.

The cakes in Examples 1 through 21 which contained acidic lipid additives are fine-grained in texture and have excellent eating qualities. Similar good results are obtained with cakes containing one or more of the other acidic lipid anhydrides defined herein.

All types of dry cake mixes and cakes can be prepared from conventional cake ingredients and obtain the benefits of this invention by addition thereto of acidic lipid anhydrides defined herein. Breads, icings, pastry shells and the like bakery products prepared from batters, doughs and similar bakery emulsions also can be improved with these acidic lipid anhydrides.

It will be understood that Examples 1 through 21, above, are merely illustrative of the invention defined and claimed herein and the skilled artisan will be able to formulate many other examples which come within the scope of this invention after reading the specification and appended claims.

What is claimed is:

1. A process for improving a shortening-containing emulsion which comprises incorporating in the emulsion from about 0.1% to about 16%, by weight of the shortening, of an acidic lipid anhydride of the general formula:

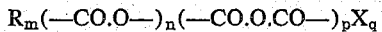

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohols, mono- and polycarboxylic acid, and hydroxy mono- and polycarboxylic acid,
$m = 1$ to 6,
$n = 0$ to 10,
$p = 1$,
$q = 0$ to 6, and provided that when $n = 0$, $q = 0$ and $m = 2$, and provided further that no carbon in R is attached to more than 2 other carbons.

2. A culinary composition comprising an edible material selected from the group consisting of flour and shortening in intimate admixture with from about 0.1% to about 16%, by weight of the composition, of an acidic lipid anhydride of the general formula:

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohol, mono- and polycarboxylic acid, and hydroxy mono- and polycarboxylic acid,
$m=1$ to 6,
$n=0$ to 10,
$p=1$,
$q=0$ to 6, and provided that when $n=0$, $q=0$ and $m=2$, and provided further that no carbon in R is attached to more than 2 other carbons.

3. A culinary composition comprising a liquid shortening in intimate admixture with from about 0.5% to about 16%, by weight of the shortening, of an alpha-phase crystal tending emulsifier and from about 0.1% to about 16%, by weight of the shortening, of an acidic lipid anhydride of the general formula:

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohol, mono- and polycarboxylic acid, and hydroxy mono- and polycarboxylic acid,
$m=1$ to 6,
$n=0$ to 10,
$p=1$,
$q=0$ to 6, and provided that when $n=0$, $q=0$ and $m=2$, and provided further that no carbon in R is attached to more than 2 other carbons.

4. The composition of claim 3 in which the acidic lipid anhydride is selected from the group consisting of stearoyl propylene glycol succinate anhydride, stearoyl propylene glycol glutarate anhydride, octadecyl glutarate anhydride, octadecyl adipate anhydride, distearin succinate anhydride, malic stearate anhydride, tartaric distearate anhydride.

5. The composition of claim 3 in which the alpha-phase crystal tending emulsifier is propylene glycol monostearate.

6. The composition of claim 3 in which the acidic lipid anhydride is selected from the group consisting of stearoyl propylene glycol succinate anhydride, stearoyl propylene glycol glutarate anhydride, octadecyl glutarate anhydride, octadecyl adipate anhydride, distearin succinate anhydride, malic stearate anhydride and tartaric distearate anhydride and the alpha-phase crystal tending emulsifier is propylene glycol monostearate.

7. A culinary composition comprising a plastic shortening in intimate mixture with from about 0.1% to about 16%, by weight of the shortening, of an acidic lipid anhydride of the general formula:

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohol, mono- and poly- carboxylic acid, and hydroxy mono- and polycarboxylic acid,
$m=1$ to 6,
$n=0$ to 10,
$p=1$,
$q=0$ to 6, and provided that when $n=0$, $q=0$ and $m=2$, and provided further that no carbon in R is attached to more than 2 other carbons.

8. The composition of claim 7 in which the acidic lipid anhydride is stearoyl propylene glycol succinate anhydride.

9. The composition of claim 7 in which the acidic lipid anhydride is distearin succinate anhydride.

10. A culinary composition comprising flour having absorbed thereon from about 0.1% to about 8%, by weight of the flour, of an acidic lipid anhydride of the general formula:

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohol, mono- and polycarboxylic acid, and hydroxy mono- and polycarboxylic acid,
$m=1$ to 6,
$n=0$ to 10,
$p=1$,
$q=0$ to 6, and provided that when $n=0$, $q=0$ and $m=2$, and provided further that no carbon in R is attached to more than 2 other carbons.

11. The composition of claim 10 in which the acidic lipid anhydride is tartaric distearate anhydride.

12. The composition of claim 10 in which the acidic lipid anhydride is octadecyl adipate anhydride.

13. A dry cake mix composition comprising flour in intimate admixture with from about 0.1 to about 8%, by weight of the flour, of an acidic lipid anhydride of the general formula:

$$R_m(-CO.O-)_n(-CO.O.CO-)_pX_q$$

wherein:
R is selected from the group consisting of aliphatic hydrocarbon radicals having from about 11 to about 21 carbon atoms,
X is a residue having from 1 to 6 carbon atoms derived from at least one member of the group consisting of mono- and polyhydric alcohols, mono- and polycarboxylic acid, and hydroxy mono- and polycarboxylic acid,
$m=1$ to 6,
$n=0$ to 10,
$p=1$,
$q=0$ to 6, and provided that when $n=0$, $q=0$ and $m=2$, and provided further that no carbon in R is attached to more than 2 other carbons.

14. The composition of claim 13 in which the acidic lipid anhydride is tartaric distearate anhydride.

15. The composition of claim 14 in which the acidic lipid anhydride is stearoyl propylene glycol succinate anhydride.

16. The composition of claim 14 in which the acidic lipid anhydride is octadecyl adipate anhydride.

17. The process of claim 8 in which the acidic lipid anhydride is mixed with a liquid shortening which contains, additionally, from about 0.5% to about 16% by weight of the shortening, of an alpha-phase crystal tending emulsifier selected from the group consisting of:
(a) a monoester of a straight chain aliphatic diol with a saturated fatty acid, said diol containing from 3 to 5 carbon atoms and said saturated fatty acid having from about 12 to about 22 carbon atoms;

(b) the condensation product of a monohydroxy-monocarboxylic acid having from 2 to 6 carbon atoms with a partial fatty acid glyceride containing an average of from 1 to 2 fatty acid radicals having from about 12 to about 22 carbon atoms;

(c) a 1,3-diglyceride containing a saturated fatty acid having from about 16 to about 22 carbon atoms and a saturated fatty acid having from 2 to 4 carbon atoms;

(d) a 1,2-digylceride containing a saturated fatty acid having from about 16 to about 22 carbon atoms and a saturated fatty acid having from about 12 to about 18 carbon atoms; and (e) a fatty acid ester of diethylene glycol, said fatty acid having from about 12 to about 22 carbon atoms.

18. A process for improving a shortening-containing emulsion which comprises incorporating in the emulsion from about 0.1% to about 16% by weight of the shortening, of an acidic lipid anhydride bearing —CO.O.CO— groups which are formed from carboxyl groups linked together from acidic lipids selected from the group consisting of:

(a) a fatty acid having from about 12 to about 22 carbon atoms;

(b) the condensation product of fatty acid containing from about 12 to about 22 carbon atoms with a monohydroxy-monocarboxylic acid having from 2 to 6 carbon atoms;

(c) the condensation product of a fatty acid having from about 12 to about 22 carbon atoms with a hydroxypolycarboxylic acid having from 1 to 4 hydroxy groups, said hydroxypolycarboxylic acid containing 3 to 6 carbon atoms and said condensation product having at least 1 free carboxyl group per molecule;

(d) the condensation product of a hydroxypolycarboxylic acid having from 1 to 4 hydroxy groups with a fatty acid having from 2 to 6 carbon atoms and with a partial fatty acid glyceride containing an average of from 1 to 2 fatty acid radicals having from about 12 to about 22 carbon atoms, said hydroxypolycarboxylic acid having 3 to 6 carbon atoms and said condensation product having at least one free carboxyl group per molecule;

(e) the condensation product of a polycarboxylic acid having from 0 to 4 hydroxy groups with hydroxy compounds selected from the group consisting of straight chain fatty alcohols having from about 12 to about 22 carbon atoms and partial fatty acid glycerides containing an average of from 1 to 2 fatty acid radicals having from about 12 to about 22 carbon atoms, said polycarboxylic acid having 3 to 6 carbon atoms and said condensation product having at least one free carboxyl group per molecule;

(f) the condensation product of a dicarboxylic acid having no hydroxy groups and containing from 3 to 6 carbon atoms with a fatty material selected from the group consisting of:

(1) a straight chain aliphatic diol ester of fatty acid, said diol having from 3 to 5 carbon atoms and said fatty acid having from about 12 to about 22 carbon atoms;

(2) a partial fatty acid glyceride containing an average of from 1 to 2 fatty acid radicals having from about 12 to about 22 carbon atoms;

(3) a partial fatty acid glyceride containing an average of at least 1 fatty acid radical having from about 12 to about 22 carbon atoms and an average of at least 1 fatty acid radical having from 2 to 6 carbon atoms;

(4) a straight chain fatty alcohol having from about 12 to about 22 carbon atoms;

(5) a hexitan ester of fatty acids having from about 12 to about 22 carbon atoms;

(6) a monohydroxy-monocarboxylic acid condensate of a partial fatty acid glyceride containing an average of from 1 to 2 fatty acid radicals having from about 12 to about 22 carbon atoms, said monohydroxy-monocarboxylic acid having from 2 to 6 carbon atoms; and (g) mixtures of the preceding materials.

19. A culinary composition comprising an edible material selected from the group consisting of flour and shortening in intimate admixture with from about 0.1% to about 16% by weight of the composition, of an acidic lipid anhydride bearing —CO.O.CO— groups which are formed from carboxyl groups linked together from acidic lipids selected from the group consisting of:

(a) a fatty acid having from about 12 to about 22 carbon atoms;

(b) the condensation product of fatty acid containing from about 12 to about 22 carbon atoms with a monohydroxy-monocarboxylic acid having from 2 to 6 carbon atoms;

(c) the condensation product of a fatty acid having from about 12 to about 22 carbon atoms with a hydroxypolycarboxylic acid having from 1 to 4 hydroxy groups, said hydroxypolycarboxylic acid containing 3 to 6 carbon atoms and said condensation product having at least 1 free carboxyl group per molecule;

(d) the condensation product of a hydroxypolycarboxylic acid having from 1 to 4 hydroxy groups with a fatty acid having from 2 to 6 carbon atoms and with a partial fatty acid glyceride containing an average of from 1 to 2 fatty acid radicals having from about 12 to about 22 carbon atoms, said hydroxypolycarboxylic acid having 3 to 6 carbon atoms and said condensation product having at least one free carboxyl group per molecule;

(e) the condensation product of a polycarboxylic acid having from 0 to 4 hydroxy groups with hydroxy compounds selected from the group consisting of straight chain fatty alcohols having from about 12 to about 22 carbon atoms and partial fatty acid glycerides containing an average of from 1 to 2 fatty acid radicals having from about 12 to about 22 carbon atoms, said polycarboxylic acid having 3 to 6 carbon atoms and said condensation product having at least one free carboxyl group per molecule;

(f) the condensation product of a dicarboxylic acid having no hydroxy groups and containing from 3 to 6 carbon atoms with a fatty material selected from the group consisting of:

(1) a straight chain aliphatic diol ester of fatty acid, said diol having from 3 to 5 carbon atoms and said fatty acid having from about 12 to about 22 carbon atoms;

(2) a partial fatty acid glyceride containing an average of from 1 to 2 fatty acid radicals having from about 12 to about 22 carbon atoms;

(3) a partial fatty acid glyceride containing an average of at least 1 fatty acid radical having from about 12 to about 22 carbon atoms and an average of at least 1 fatty acid radical having from 2 to 6 carbon atoms;

(4) a straight chain fatty alcohol having from about 12 to about 22 carbon atoms;

(5) a hexitan ester of fatty acids having from about 12 to about 22 carbon atoms;

(6) a monohydroxy-monocarboxylic acid condensate of a partial fatty acid glyceride containing an average of from 1 to 2 fatty acid radicals having from about 12 to about 22 carbon atoms, said monohydroxy-monocarboxylic acid having from 2 to 6 carbon atoms; and (g) mixtures of the preceding materials.

20. The process of claim 1 in which the acidic lipid anhydride is selected from the group consisting of stearoyl propylene glycol succinate anhydride, stearoyl propylene glycol glutarate anhydride, octadecyl glutarate anhydride, octadecyl adipate anhydride, distearin succinate anhydride, monostearin disuccinate anhydride, malic stearate anhydride, tartaric distearate anhydride, stearoyl 4-hydroxy butyric anhydride, stearoyl ethylene glycol succinate anhydride, oleyoyl propylene glycol glutarate anhydride, stearoyl butanediol succinate anhydride, stearyl monoglyceridyl citrate anhydride, monoglyceridyl lactate anhydride, diacetyl monoglyceridyl tartrate anhydride, stearoyl sorbitan glutarate anhydride, stearic anhydride and palmitic anhydride.

References Cited in the file of this patent

UNITED STATES PATENTS

| | | |
|---|---|---|
| 2,874,053 | Mills | Feb. 17, 1959 |
| 2,973,270 | Thompson et al. | Feb. 28, 1961 |
| 3,071,472 | Hager et al. | Jan. 1, 1963 |

UNITED STATES PATENT OFFICE
CERTIFICATE OF CORRECTION

Patent No. 3,168,405                        February 2, 1965

James Bruce Martin et al.

It is hereby certified that error appears in the above numbered patent requiring correction and that the said Letters Patent should read as corrected below.

Column 3, the radical "(8)" should appear as shown below instead of as in the patent:

column 11, line 18, for "example" read -- examples --; column 12, Table III, first column, line 1 thereof, for "4 Hydroxy" read -- 4-Hydroxy --; line 47, for "icing" read -- icings --; column 16, line 5, for "proplylene" read -- propylene --; lines 26 and 27, for "proplyene" read -- propylene --; column 17, line 65, for "diglyceries" read -- diglycerides --; column 18, line 35, for "additives" read -- anhydrides --; column 20, line 66, for the claim reference numeral "8" read -- 1 --; column 21, line 18, and column 22, line 9, after "16%", each occurrence, insert a comma.

Signed and sealed this 10th day of August 1965.

(SEAL)
Attest:

ERNEST W. SWIDER                      EDWARD J. BRENNER
Attesting Officer                    Commissioner of Patents